(12) United States Patent
Juan Lien Chang et al.

(10) Patent No.: US 11,359,708 B2
(45) Date of Patent: Jun. 14, 2022

(54) FLEXPLATE FOR CONNECTING DAMPER ASSEMBLY TO AN INTERNAL COMBUSTION ENGINE CRANKSHAFT

(71) Applicant: Schaeffler Technologies AG & Co. KG

(72) Inventors: Raymundo Juan Lien Chang, San Pedro Cholula (MX); Alfredo Perez Mitre Jimenez, Wooster, OH (US); Angel Josue Lopez, Puebla (MX)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 261 days.

(21) Appl. No.: 16/544,336

(22) Filed: Aug. 19, 2019

(65) Prior Publication Data
US 2021/0054916 A1 Feb. 25, 2021

(51) Int. Cl.
| | |
|---|---|
| *F16H 55/00* | (2006.01) |
| *F16H 55/12* | (2006.01) |
| *F16D 3/79* | (2006.01) |
| *F16D 1/076* | (2006.01) |

(52) U.S. Cl.
CPC .............. *F16H 55/12* (2013.01); *F16D 1/076* (2013.01); *F16D 3/79* (2013.01)

(58) Field of Classification Search
CPC . F16H 55/17; F16D 1/076; F16D 3/79; F16D 1/072
USPC ............................................................. 74/449
See application file for complete search history.

(56) References Cited

U.S. PATENT DOCUMENTS

| | | | | |
|---|---|---|---|---|
| 5,367,916 A | * | 11/1994 | Bevc .................. | F16D 1/076 74/449 |
| 9,518,645 B2 | * | 12/2016 | McCombs .............. | F16F 15/30 |

FOREIGN PATENT DOCUMENTS

DE 102014214191 A1 * 1/2016 ........ F16F 15/13142

* cited by examiner

*Primary Examiner* — Jake Cook
(74) *Attorney, Agent, or Firm* — Davidson, Davidson & Kappel, LLC (57) ABSTRACT

A flexplate for a motor vehicle drivetrain includes a carry plate configured for being connected to an engine crankshaft and a drive plate. The drive plate and the carry plate are separate components attached directly via contact. The drive plate is configured for transferring torque input into the carry plate to a downstream component. A method of constructing a flexplate for a motor vehicle drivetrain includes stamping a carry plate configured for being connected to an engine crankshaft; stamping a drive plate separate from the carry plate; and attaching the drive plate and the carry plate directly together via contact. The drive plate is configured for transferring torque input into the carry plate to a downstream component.

20 Claims, 7 Drawing Sheets

FLEXPLATE FOR CONNECTING DAMPER ASSEMBLY TO AN INTERNAL COMBUSTION ENGINE CRANKSHAFT

The present disclosure relates generally to motor vehicle drivetrains and more specifically to flexplates in motor vehicle drivetrains.

BACKGROUND

In motor vehicle drivetrains, flexplates are a common product used in several vehicles to connect the engine to the system that connects to the transmission.

SUMMARY

A flexplate for a motor vehicle drivetrain includes a carry plate configured for being connected to an engine crankshaft and a drive plate. The drive plate and the carry plate are separate components attached directly via contact. The drive plate is configured for transferring torque input into the carry plate to a downstream component.

Embodiments of the flexplate may include a ring gear fixed to the carry plate configured for operating as a starter for an engine. The ring gear may be welded to the carry plate. The carry plate may include a disc shaped base and an annular rim protruding axially from the base. The drive plate may be attached directly to the disc shaped base via contact. The ring gear may be fixed to the annular rim. The drive plate may be press fit onto an output side surface of the carry plate. The drive plate may include a radially inner ring section and a radially outer ring section. The radially inner ring section may be press fit onto an output side surface of the carry plate. The drive plate may further include a plurality of circumferentially spaced axially extending spokes connecting the radially inner ring section to the radially outer ring section. The flexplate may further include a plurality of clinch nuts press fit to the drive plate in slots between the spokes. The clinch nuts may be in notches in the carry plate. The flexplate may further include a backing plate concentrically attached to an output side of the carry plate directly via contact. The flexplate may further include dowel pins fixed in holes in the drive plate and protruding axially at an output side of the drive plate.

A motor vehicle drivetrain is also provided including an engine crankshaft; and the flexplate in accordance with any combination of the above-mentioned features connected to the engine crankshaft for being driven by the engine crankshaft. The motor vehicle drivetrain may further include a damper assembly connected to the flexplate. The flexplate may be arranged for transferring torque from the engine crankshaft to the damper assembly.

A method of constructing a flexplate for a motor vehicle drivetrain is also provided. The method includes stamping a carry plate configured for being connected to an engine crankshaft; stamping a drive plate separate from the carry plate; and attaching the drive plate and the carry plate directly together via contact. The drive plate may be configured for transferring torque input into the carry plate to a downstream component.

In embodiments of the method, the attaching of the drive plate and the carry plate directly together via contact includes press fitting the drive plate onto an output side surface of the carry plate. The method may further include stamping a backing plate and concentrically attaching the backing plate directly via contact to an output side of the carry plate. The method may further include fixing a ring gear to the drive plate, the ring gear configured for being a starter for an engine.

BRIEF DESCRIPTION OF THE DRAWINGS

The present disclosure is described below by reference to the following drawings, in which.

DETAILED DESCRIPTION

The disclosure provides a flexplate that is easy to produce and assemble and also has a cost advantage against existing known flexplates. In one exemplary embodiment, the flexplate is a fully stamped flexplate—i.e., all of the components of the flexplate are formed by stamping, except for the clinch nuts and dowel pins, which may be formed by cold forming. The flexplate utilizes clinch nuts for fixing to a damper assembly, instead of threaded holes. In one exemplary embodiment, press fitting is used to attach all components together, avoiding the use of rivets on the flexplate.

Figure 1:
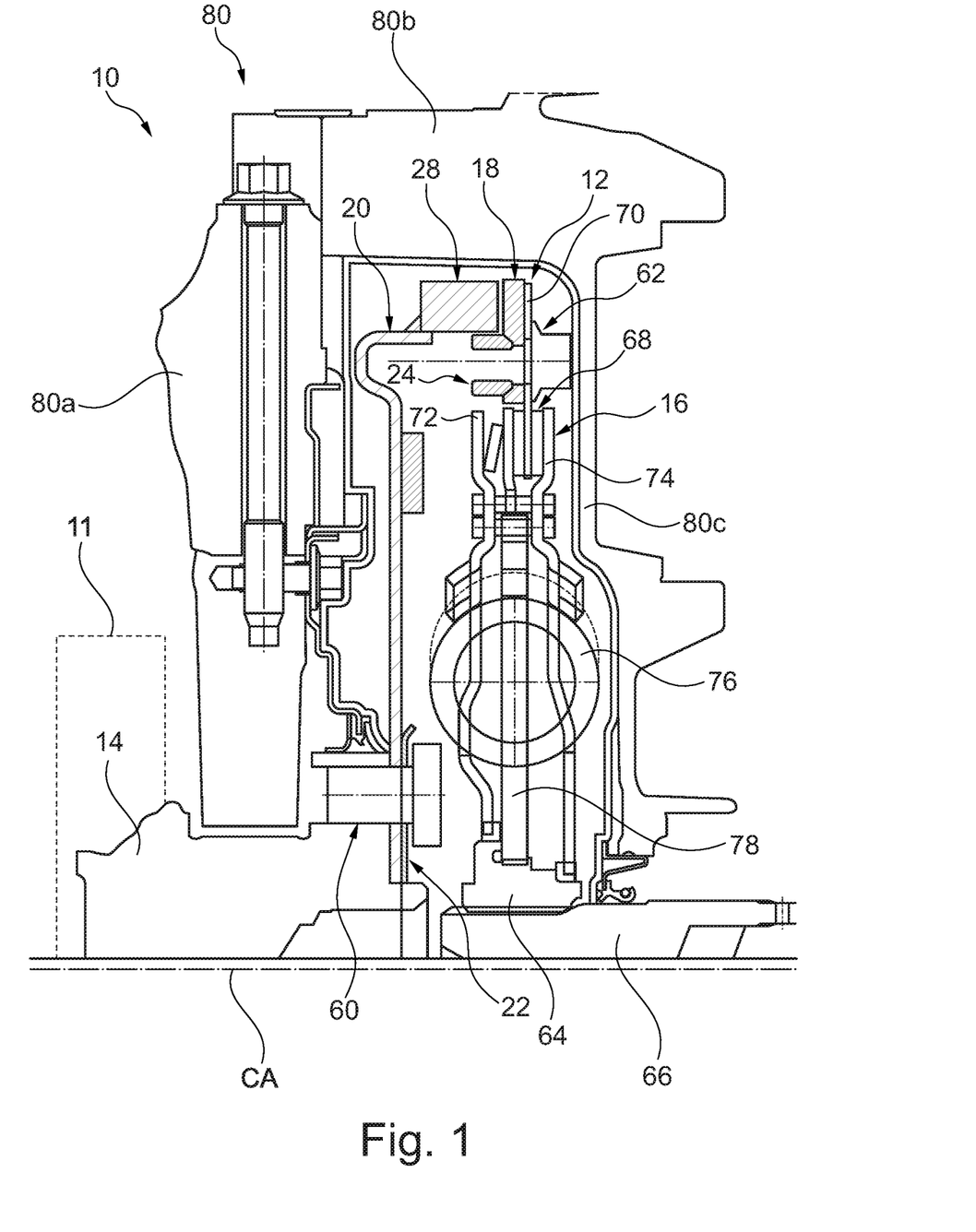
FIG. 1 shows a cross-sectional side view of a motor vehicle drive train including a flexplate in accordance with an embodiment of the present disclosure.

FIG. 1 schematically shows a cross-sectional side view of a motor vehicle drivetrain assembly 10 including a flexplate 12 according to an embodiment of the present disclosure. Flexplate 12 is configured for being fixed between an internal combustion engine crankshaft 14 of an engine 11 and a downstream component in the form of a damper assembly 16 and is configured for transferring torque from crankshaft 14 to the downstream component—i.e., damper assembly 16.

Figure 2:
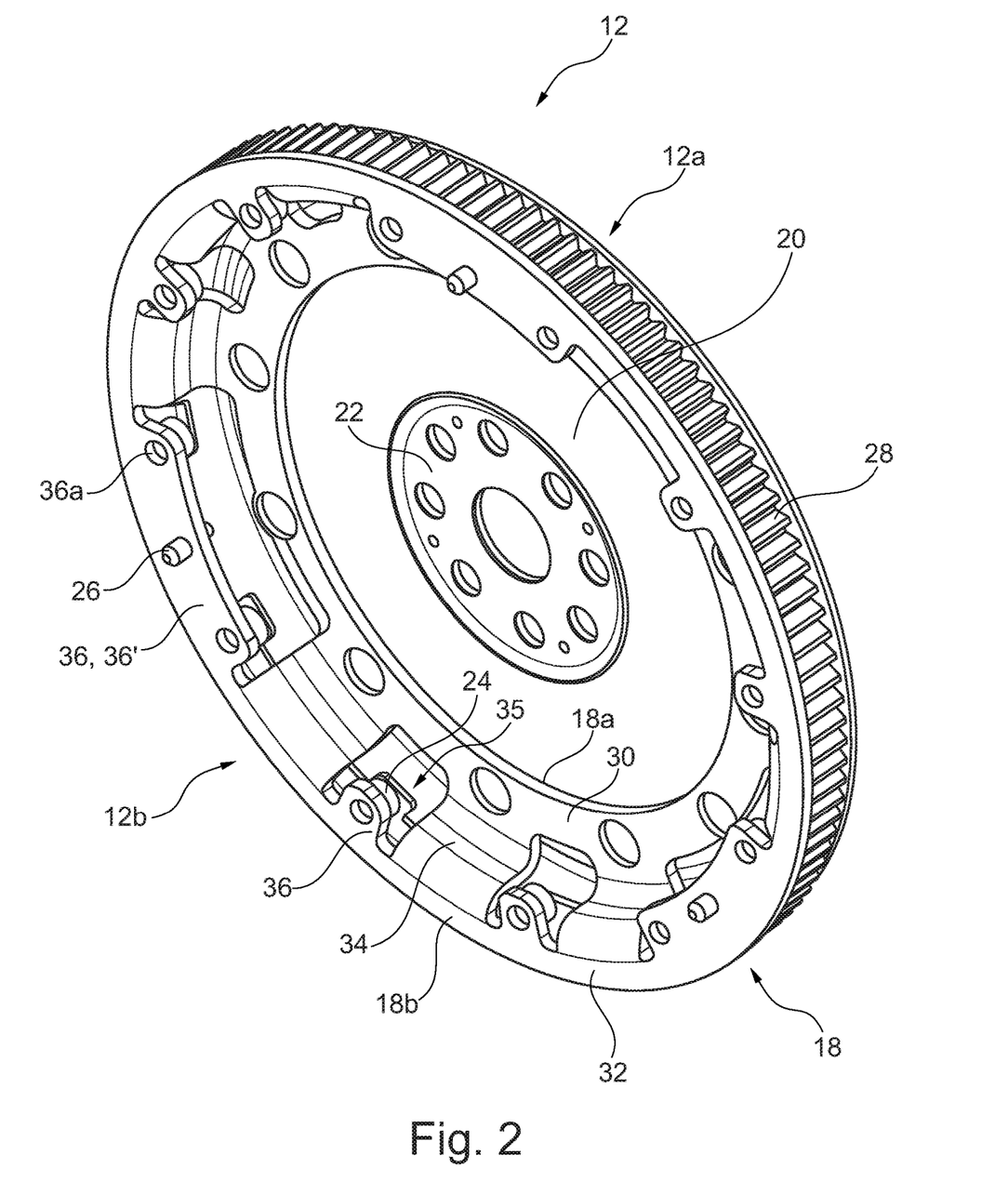
FIG. 2 shows a perspective view of the flexplate shown in FIG. 1.
Figure 3:
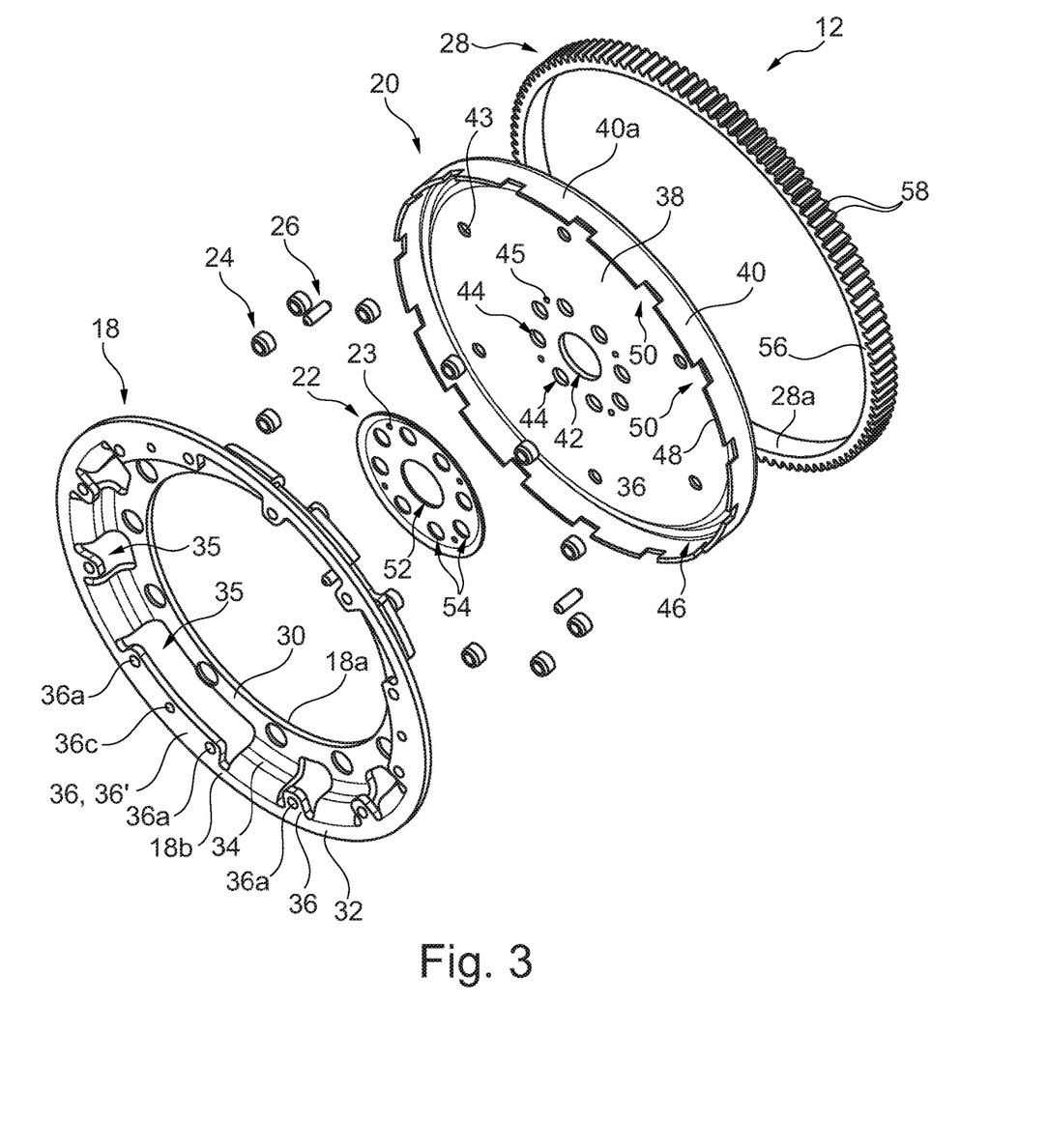
FIG. 3 shows an exploded perspective view of the flexplate shown in FIGS. 1 and 2.
Figure 4:
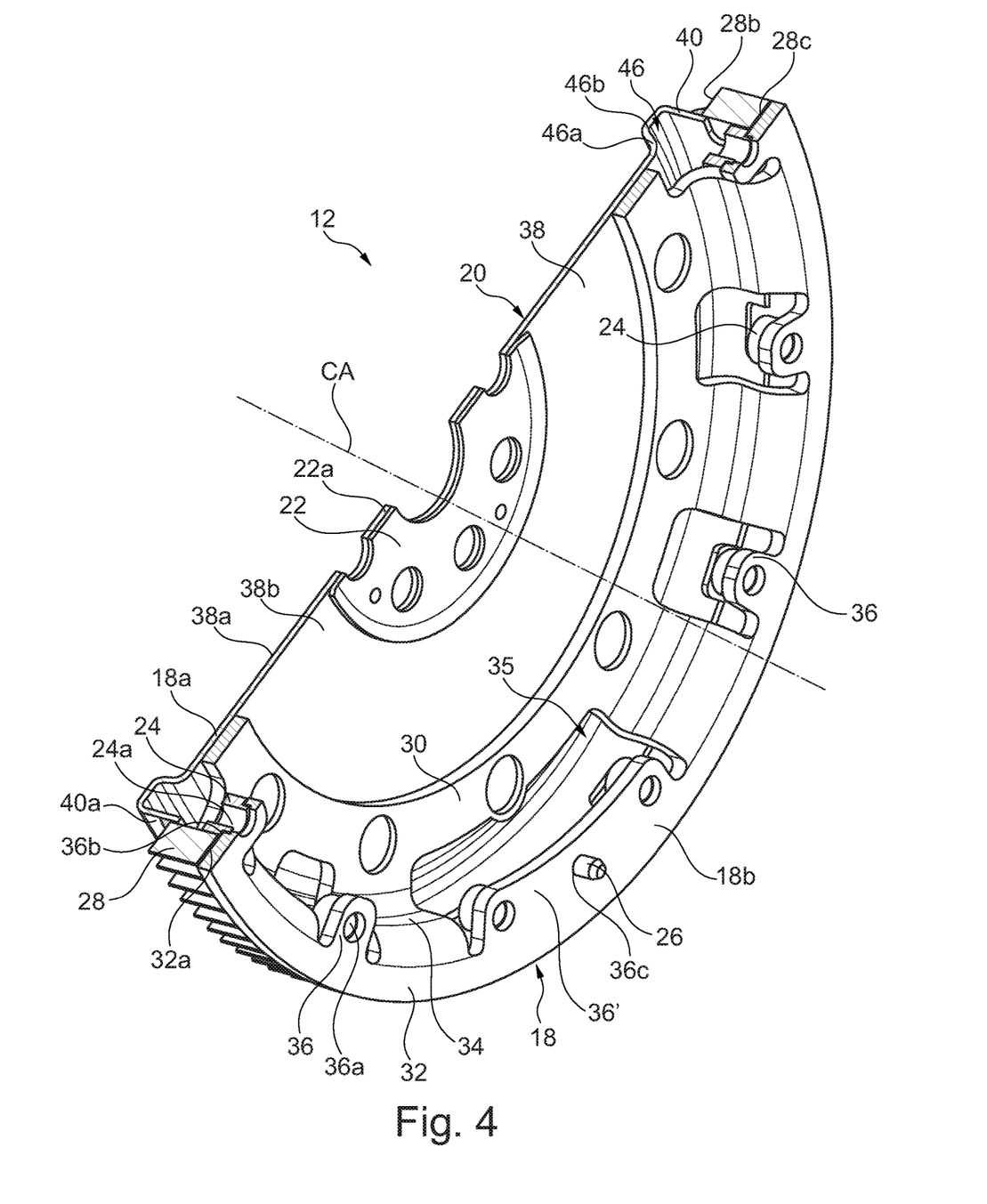
FIG. 4 shows a cross-sectional perspective view of the flexplate shown in FIGS. 1 to 3.

FIGS. 2 to 4 show different views of flexplate 12. FIG. 2 shows a perspective view of flexplate 12, FIG. 3 shows an exploded perspective view of flexplate 12 and FIG. 4 shows a cross-sectional perspective view of flexplate 12.

Referring to FIGS. 1 to 4 together, flexplate 12 is configured for rotating about a center axis CA (FIGS. 1 and 4) during operation. Unless otherwise specified herein, the terms radial, axial and circumferential, and derivatives thereof, are used in reference to center axis CA. As denoted in FIG. 2, flexplate 12 includes an input side 12a configured for facing the engine 11 and receiving a torque input from the engine 11, and an output side 12b configured for facing damper assembly 16 and outputting torque to the damper assembly 16.

Flexplate 12 is formed by a plurality of components—drive plate 18, carry plate 20, backing plate 22, clinch nuts 24, dowel pins 26, ring gear 28—that are separately created, then joined together. Carry plate 20 is fixed to crankshaft 14 by fasteners 60 passing through carry plate 20 and backing plate 22 and drive plate 18 is fixed to damper assembly 16 by fasteners 62 passing axially through drive plate 18 and into clinch nuts 24. A torque output of flex plate 12 is fixed to a torque input of damper assembly 16, which includes a torque output in the form of a damper hub 64 that is configured for being drivingly connected to an outer circumferential surface of a transmission input shaft 66. Damper assembly includes a slip clutch 68, having an input plate 70 that is fixed to and abuts drive plate 18 by fasteners 62, cover plates 72, 74 driven by slip clutch 68, springs 76 driven by cover plates 72, 74 and a damper flange 78 driven by springs 76. Damper flange 78 is non-rotatably fixed to damper hub 64.

Drivetrain assembly 10 further includes a housing 80 surrounding flexplate 12 and damper assembly 16. Housing 80 includes an input side radially extending section 80a on the input side of flexplate 12, an axially extending section 80b extending axially from a radially outer end of section 80a, and an output side radially extending section 80c on the output side of damper assembly 16 extending radially inward from section 80c. An inner circumference of section 80a sealingly contacts and an outer circumferential surface of crankshaft 14 and an inner circumference of section 80c sealingly contacts an outer circumference of transmission input shaft 66 such that crankshaft 14 and transmission input shaft 66 are rotatably with respect to housing 80.

In one exemplary embodiment, drive plate 18, carry plate 20 and backing plate 22 are each formed by stamping, and clinch nuts 24 and dowel pins 26 are formed by cold forming. After forming of each of drive plate 18, carry plate 20, backing plate 22, clinch nuts 24, dowel pins 26 and ring gear 28, these components are fixed together. Backing plate 22 is attached directly via contact to carry plate 20, carry plate 20 is attached directly via contact to drive plate 18, clinch nuts 24 are attached directly via contact to drive plate 18 and ring gear 28 is attached to carry plate 20 via welding. By attached directly via contact, it is meant that the components are attached to one another via contact, without any further components such as fasteners or welding. In particular, in some exemplary embodiments, backing plate 22 is attached to carry plate 20 via press fitting, carry plate 20 is attached to drive plate 18 via press fitting, clinch nuts 24 are attached drive plate 18 via press fitting and ring gear 28 is attached to carry plate 20 via welding.

Figure 5A:
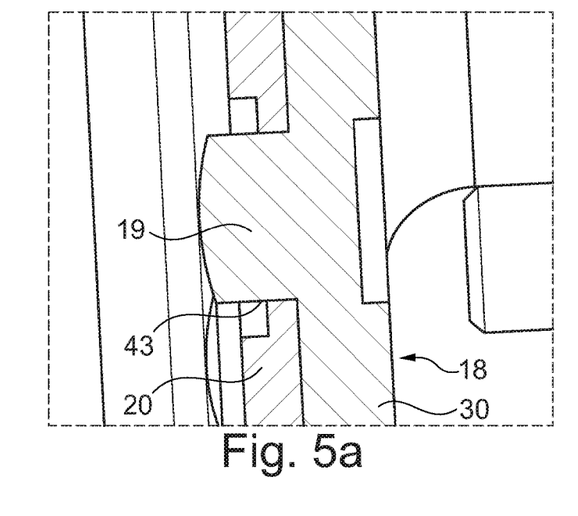
FIGS. 5a to 5d show cross-sectional views illustrating exemplary techniques for press fitting components together.
Figure 5B:
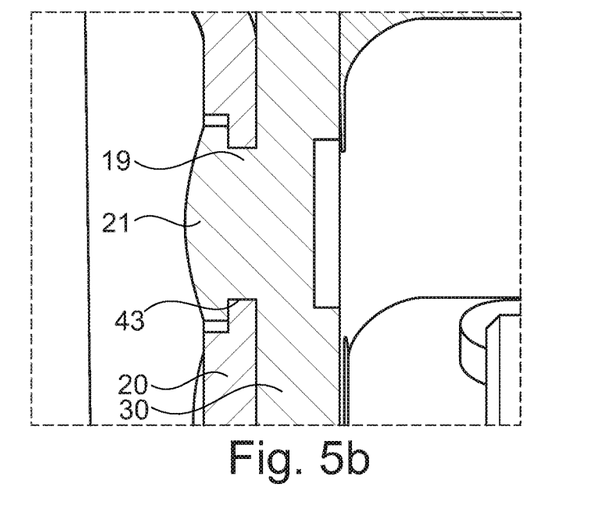
Figure 5C:
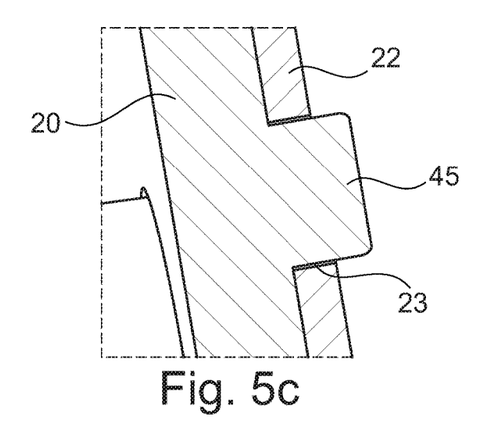
Figure 5D:
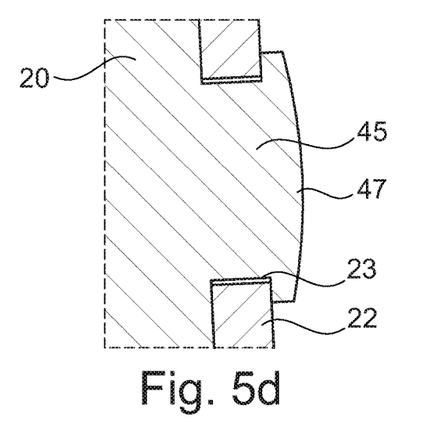

In particular, as shown in FIGS. 5a and 5b, protrusions 19 on the input side of inner ring section 30 of drive plate 18 may be passed through holes 43 passing axially through carry plate 20 into the position shown in FIG. 5a, and then pressed to form a head 21 fixing plates 18, 20 together, as shown in FIG. 5b. Similarly, as shown in FIGS. 5c and 5d, the press fitting of backing plate 22 and carry plate 20 together may involve protrusions 45 on the output side of carry plate 20 being inserted through holes 23 passing axially through backing plate 22 into the position shown in FIG. 5a, and then pressed to form a head 47 fixing plates 20, 22 together.

Carry plate 20 is configured for attaching to engine crankshaft 14. Torque is transferred from the carry plate 20 to the drive plate 18, then from drive plate 18 to the clinch nuts 24 and into damper assembly 16. Dowel pins 26 are configured for centering damper assembly 16 to flexplate 12. Ring gear 28 is configured to act as starter of the internal combustion engine.

Drive plate 18 includes a radial inner ring section 30, a radial outer ring section 32 and plurality of circumferentially spaced spokes 34 extending radially outward and axially from radial inner ring section 30 to radial outer ring section 32. Spokes 34 are circumferentially spaced from each other by slots 35. Radially inner ring section 30 defines an inner circumference of drive plate 18 and radially outer ring section 32 defines an outer circumference of drive plate 18. Radially inner ring section 30 defines an input side radially extending surface 18a of drive plate 18 and radially outer ring section 32 defines an output side radially extending surface 18b of drive plate 18.

Drive plate 18 further includes, at output side surface 18b, a plurality of drive plate 18 connectors in the form of circumferentially spaced tabs 36. Each of tabs 36 protrudes radially inward from outer ring section 32 in axial alignment with one of slots 35. Tabs 36 each include at least one respective hole 36a passing axially therethrough that is axially aligned with a threaded hole 24a of a respective one of clinch nuts 24. Clinch nuts 24 are made of a harder metal than drive plate 18, and as shown in FIG. 4, are each press fit into drive plate 18 by penetrating into an input side surface 36b of the respective tab 36.

Figure 6:
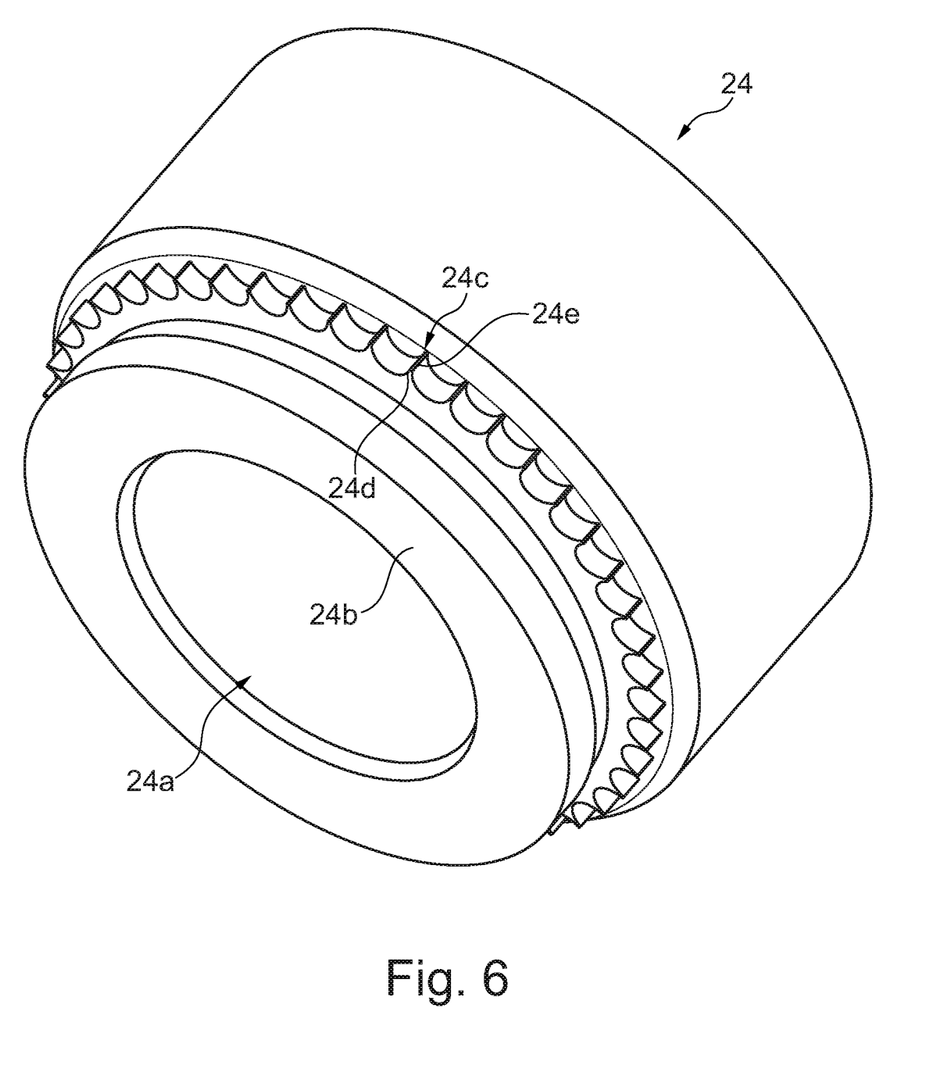
FIG. 6 shows a perspective view of an exemplary clinch nut.

As shown in FIG. 6, clinch nuts 24 each include an annular rim 24b that is inserted into the respective hole 36a, and directly axially adjacent to rim 24b, a ring of plurality of radially extending teeth 24c. A sharp edge 24d of each of teeth 24c include a point 24e configured for piercing into the input side surface 36b of the respective tab 36 such that teeth 24c penetrate into surface 36b, causing the clinch nut 24 to be press-fit to drive plate 18. In one exemplary embodiment, drive plate 18 and carry plate 20 are formed on a hot-rolled, high-strength low-alloy steel, for example S355MC, backing plate 22 is formed of a high carbon steel, for example SAE1074/1075, and ring gear 28 is formed of a medium carbon steel, for example SAE 1045. Tabs 36 include some circumferentially wider tabs 36' that each include two holes 36a for aligning with clinch nuts 24 and a further hole 36c for receiving one of dowel pins 26. Flexplate 12 is connectable to damper assembly 16 by aligning dowel pins 26, received in holes 36c, in holes in damper assembly 16 and driving threaded fasteners through holes 36a and into threaded holes 24a of clinch nuts 24.

Carry plate 20 includes a disc shaped base 38 and an annular rim 40 protruding axially from base 38. Rim 40 defines an outer circumferential surface 40a of carry plate 20. Base 38 includes a central hole 42, centered on center axis CA, formed therein for receiving a pilot of crankshaft 14 and a plurality of circumferentially spaced fastening holes 44 radially outward from central hole 42. Fastening holes 44 are configured for receiving fasteners that fasten carry plate 20 directly to crankshaft 14. Base 38 further includes a recessed annular groove 46 at an outer diameter thereof, which is recessed compared to a remainder of base 38, including the portion including holes 42, 44. As shown in FIG. 4, groove 46 is defined by an axially extending ring 46a and a radially extending ring 46b and is delimited radially outwardly by rim 40. A free edge 48 of rim 40 includes a plurality of circumferentially spaced notches 50 formed therein. Each of notches 50 receives one of clinch nuts 24. Base 38 includes an input side radially extending surface 38a that is configured for abutting crankshaft 14 and an output side radially extending surface 38b that contacts input side radially extending surface 18a of drive plate 18.

Backing plate 22 has a smaller outer diameter than plates 18, 20 and includes an input side radially extending surface 22a that contacts output side radially extending surface 38b of carry plate 20. Backing plate 22 includes a central hole 52, centered on center axis CA and aligned with central hole 42 of carry plate 20, formed therein for receiving the pilot of crankshaft 14. Backing plate 22 also includes a plurality of circumferentially spaced fastening holes 54 radially outward from central hole 52. Fastening holes 54 are aligned with fastener holes 44 of carry plate 20 and also configured for receiving fasteners 60 that fasten carry plate 20 directly to crankshaft 14. In the embodiment shown in FIGS. 2 to 4, central hole 52 is the same size and shape as central hole 42 and fastener holes 54 are the same size and shape as fastener holes 44. Backing plate 22 provides stiffness to carry plate 20 and acts as bushing for the fasteners 60 that are used to connect carry plate 20 to crankshaft 14.

Figure 7:
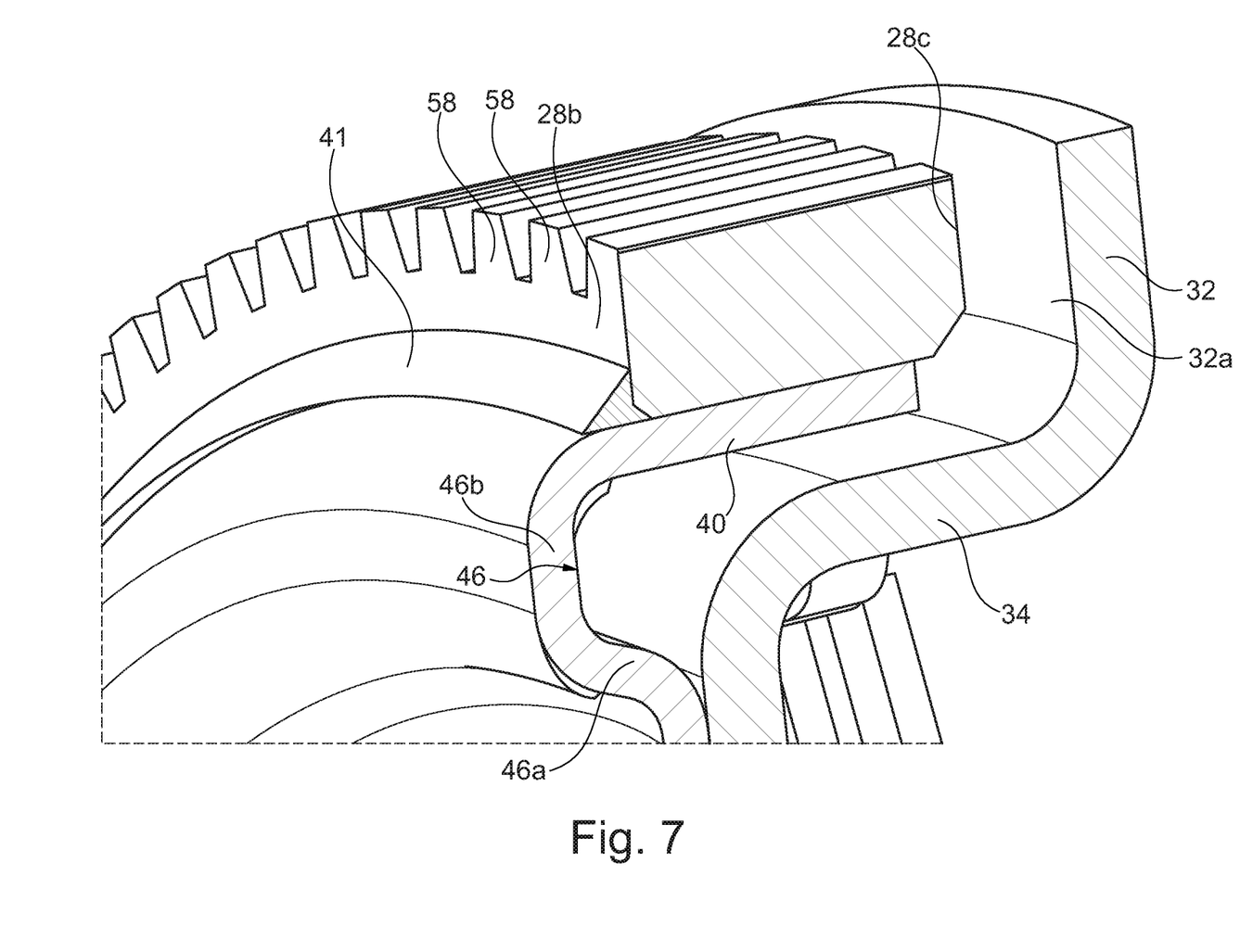
FIG. 7 shows a cross-sectional perspective view illustrating the welding of a ring gear to a carry plate.

Ring gear 28 has a constant thickness and includes an annular base 56 defining an inner circumferential surface 28a thereof and a plurality of circumferentially spaced teeth 58 extending radially outward from base 56. Ring gear 28 includes an input side radially extending surface 28b for facing toward crankshaft 14 and an output side radially extending surface 28c for directly facing an input side radially extending surface 32a of radial outer ring section 32 of drive plate 18. In some exemplary embodiments, as shown in FIGS. 1 and 7, input side radially extending surface 28b is fixed to carry plate 20 via welding. In one exemplary embodiment, rim 40 is used as the welding material that welds ring gear 28 and carry plate 20 together, forming weld 41 shown in FIG. 7 at input side radially extending surface 28b of ring gear 28. Ring gear 28 is positioned directly radially outward from rim 40 of carry plate 20 and outer circumferential surface 40a of rim 40 may contact an inner circumferential surface 28a of ring gear 28.

A method of constructing flexplate 12 in accordance with an embodiment of the present disclosure will now be described. Clinch nuts 24 are press fit into tabs 36 of drive plate 18 and backing plate 22 and drive plate 18 are press fit onto surface 38b of base 38 of carry plate 20, with clinch nuts 24 being aligned in notches 50. Ring gear 28 is then slid over outer circumferential surface 40a of rim 40 of carry plate 20 and welded to the outer circumferential surface of rim 40 of carry plate 20.

In the preceding specification, the disclosure has been described with reference to specific exemplary embodiments and examples thereof. It will, however, be evident that various modifications and changes may be made thereto without departing from the broader spirit and scope of disclosure as set forth in the claims that follow. The specification and drawings are accordingly to be regarded in an illustrative manner rather than a restrictive sense.

LIST OF REFERENCE NUMERALS 10 motor vehicle drivetrain
11 engine
12 flexplate
12a input side
12b output side
14 engine crankshaft
16 damper assembly
18 drive plate
19 protrusions
20 carry plate
21 head
22 backing plate
23 protrusion receiving holes
24 clinch nuts
24a threaded hole
24b annular rim
24c radially extending teeth
24d sharp edge
24e piercing point
26 dowel pins
28 ring gear
28a inner circumferential surface
28b input side radially extending surface
28c output side radially extending surface
30 radial inner ring section
32 radial outer ring section
34 spokes
35 slots
36 tabs
36a fastener holes
36b input side surface
36' wider tabs
36c dowel holes
38 disc shaped base
40 annular rim
41 weld
42 central hole
43 protrusion receiving holes
44 fastening holes
45 protrusions
46 annular groove
47 head
48 free edge
50 notches
52 central hole
54 fastening holes
56 annular base
58 teeth
60 fasteners
62 fasteners
64 damper hub
66 transmission input shaft
68 slip clutch
70 input plate
72 cover plate
74 cover plate
76 springs
78 damper flange
80 housing
80a input side radially extending section
80b axially extending section
80c output side radially extending section

What is claimed is:

1. A flexplate for a motor vehicle drivetrain comprising:
a carry plate configured for being connected to an engine crankshaft; and
a drive plate, the drive plate and the carry plate being separate components attached directly via contact, the drive plate being configured for transferring torque input into the carry plate to a downstream component,
the drive plate including a radially inner ring section and a radially outer ring section, the radially inner ring section contacting an output side surface of the carry plate,
the drive plate further including a plurality of circumferentially spaced axially extending spokes connecting the radially inner ring section to the radially outer ring section.

2. The flexplate as recited in claim 1 further comprising a ring gear fixed to the carry plate configured for operating as a starter for an engine.

3. The flexplate as recited in claim 2 wherein the ring gear is welded to the carry plate.

4. The flexplate as recited in claim 2 wherein the carry plate includes a disc shaped base and an annular rim protruding axially from the base, the drive plate being attached directly to the disc shaped base via contact, the ring gear being fixed to the annular rim.

5. The flexplate as recited in claim 1 wherein the drive plate is press fit onto an output side surface of the carry plate.

6. The flexplate as recited in claim 5 wherein the radially inner ring section is press fit onto the output side surface of the carry plate.

7. The flexplate as recited in claim 1 further comprising a plurality of clinch nuts press fit to the drive plate in slots between the spokes.

8. The flexplate as recited in claim 7 wherein the clinch nuts are in notches in the carry plate.

9. The flexplate as recited in claim 1 further comprising a backing plate concentrically attached to an output side of the carry plate directly via contact.

10. The flexplate as recited in claim 1 further comprising dowel pins fixed in holes in the drive plate and protruding axially at an output side of the drive plate.

11. A motor vehicle drivetrain comprising:
the flexplate recited in claim 1 including a plurality of holes configured for receiving fasteners for connecting to the engine crankshaft.

12. The motor vehicle drivetrain as recited in claim 11 further comprising a damper assembly connected to the flexplate, the flexplate being arranged for transferring torque from the engine crankshaft to the damper assembly.

13. A method of constructing the flexplate as recited in claim 1, the method comprising:
stamping the carry plate configured for being connected to the engine crankshaft;
stamping the drive plate separate from the carry plate; and
attaching the drive plate and the carry plate directly together via contact, the drive plate being configured for transferring torque input into the carry plate to the downstream component.

14. The method as recited in claim 13 wherein the attaching of the drive plate and the carry plate directly together via contact includes press fitting the drive plate onto an output side surface of the carry plate.

15. The method as recited in claim 13 further comprising stamping a backing plate and concentrically attaching the backing plate directly via contact to an output side of the carry plate.

16. The method as recited in claim 13 further comprising fixing a ring gear to the drive plate, the ring gear configured for being a starter for an engine.

17. A flexplate for a motor vehicle drivetrain comprising:
a carry plate configured for being connected to an engine crankshaft;
a drive plate, the drive plate and the carry plate being separate components attached directly via contact, the drive plate being configured for transferring torque input into the carry plate to a downstream component, the drive plate including a radially inner ring section and a radially outer ring section, the radially inner ring section contacting an output side surface of the carry plate, the drive plate further including a plurality of circumferentially spaced tabs protruding radially inward from outer ring section; and
clinch nuts penetrating into input side surfaces of the circumferentially spaced tabs.

18. The flexplate as recited in claim 17 wherein the clinch nuts are in notches in the carry plate.

19. A flexplate for a motor vehicle drivetrain comprising:
a carry plate configured for being connected to an engine crankshaft;
a drive plate, the drive plate and the carry plate being separate components attached directly via contact, the drive plate being configured for transferring torque input into the carry plate to a downstream component, the drive plate including a radially inner ring section and a radially outer ring section, the radially inner ring section contacting an output side surface of the carry plate; and
a ring gear fixed to the carry plate configured for operating as a starter for an engine, the ring gear including an output side radially extending surface directly facing an input side radially extending surface of the radial outer ring section of the drive plate.

20. The flexplate as recited in claim 19 further comprising a plurality of clinch nuts press fit to the drive plate, the ring gear being directly radially outside of the clinch nuts.

* * * * *